US 11,146,138 B2

(12) United States Patent
Katsura et al.

(10) Patent No.: US 11,146,138 B2
(45) Date of Patent: Oct. 12, 2021

(54) ROTATING ELECTRICAL MACHINE

(71) Applicant: EXEDY CORPORATION, Neyagawa (JP)

(72) Inventors: Hitoshi Katsura, Neyagawa (JP); Taichi Kitamura, Neyagawa (JP); Kimitaka Uemura, Neyagawa (JP)

(73) Assignee: EXEDY CORPORATION, Neyagawa (JP)

(*) Notice: Subject to any disclaimer, the term of this patent is extended or adjusted under 35 U.S.C. 154(b) by 0 days.

(21) Appl. No.: 16/392,222

(22) Filed: Apr. 23, 2019

(65) Prior Publication Data
US 2019/0334401 A1    Oct. 31, 2019

(30) Foreign Application Priority Data

Apr. 27, 2018  (JP) .............................. JP2018-087317

(51) Int. Cl.
*H02K 3/34*       (2006.01)
*H02K 5/15*       (2006.01)
(Continued)

(52) U.S. Cl.
CPC ............. *H02K 3/345* (2013.01); *H02K 1/182* (2013.01); *H02K 5/15* (2013.01); *H02K 41/033* (2013.01)

(58) Field of Classification Search
CPC ...... H02K 1/182; H02K 3/345; H02K 41/033; H02K 5/15; H02K 19/103; H02K 19/12;
(Continued)

(56) References Cited

U.S. PATENT DOCUMENTS 3,663,846 A    5/1972  Wagner et al.
4,958,095 A    9/1990  Uchida et al.
(Continued)

FOREIGN PATENT DOCUMENTS

JP    H10-304633 A    11/1998
JP    H11-243672 A    9/1999
(Continued)

OTHER PUBLICATIONS

U.S. Appl. No. 16/392,101, filed Apr. 23, 2019 in the name of Katsura et al.
(Continued)

*Primary Examiner* — Alex W Mok
(74) *Attorney, Agent, or Firm* — United IP Counselors, LLC

(57) ABSTRACT

A rotating electrical machine of a brushless wound field type disposed between a stationary case and rotating member that rotates inside the case includes a stator held by the case, including an AC coil that generates a rotating magnetic field with an alternating current, a field core held by the case, the field core including a field coil that generates a magnetic flux with a direct current, a rotor fixed in contact with an outer circumferential surface of the rotating member and held rotatably relative to the stator and field coil, a rotor side core portion that is a part of the rotating member. The magnetic flux of the field coil passes from the field core through the rotor via the second air gap, the stator and rotor via the first air gap, the rotor side core portion, and the field core via the third air gap.

16 Claims, 12 Drawing Sheets

(51) Int. Cl.
*H02K 41/03* (2006.01)
*H02K 1/18* (2006.01)

(58) Field of Classification Search
CPC .......... H02K 19/24; H02K 19/26; H02K 1/12; H02K 2201/03; H02K 7/006; H02K 7/10; H02K 7/108; F02N 11/04
USPC .......................................................... 310/195
See application file for complete search history.

(56) References Cited

U.S. PATENT DOCUMENTS

| | | | |
|---|---|---|---|
| 5,955,807 | A | 9/1999 | Kajiura et al. |
| 9,434,176 | B1 | 9/2016 | Kroon |
| 2002/0158523 | A1 | 10/2002 | Abadia et al. |
| 2008/0122309 | A1 | 5/2008 | Kolomeitsev et al. |
| 2009/0184601 | A1 | 7/2009 | Dubus et al. |
| 2009/0283344 | A1 | 11/2009 | Arnold et al. |
| 2013/0154410 | A1 | 6/2013 | Morita et al. |
| 2016/0352203 | A1* | 12/2016 | Kusase ................. H02K 1/246 |
| 2017/0218910 | A1 | 8/2017 | Sato et al. |

FOREIGN PATENT DOCUMENTS

| | | |
|---|---|---|
| JP | 3445492 B2 | 9/2003 |
| JP | 3704881 B2 | 10/2005 |
| JP | 2009-508464 A | 2/2009 |
| JP | 2010-516558 A | 5/2010 |
| JP | 4782348 B2 | 9/2011 |
| JP | 4787242 B2 | 10/2011 |
| JP | 2016-211591 A | 12/2016 |
| JP | 2017-013495 A | 1/2017 |
| JP | 2017-136902 A | 8/2017 |
| WO | 84/01478 A1 | 4/1984 |
| WO | 2012-029707 A1 | 3/2012 |
| WO | 2018/012170 A1 | 1/2018 |
| WO | 2018/139561 A1 | 8/2018 |

OTHER PUBLICATIONS

U.S. Appl. No. 16/392,148, filed Apr. 23, 2019 in the name of Katsura et al.
Extended European Search Report for the corresponding European Patent Application No. 19171307.2, dated Sep. 3, 2019, 9 pp.
Office Action of the corresponding European Patent Application No. 19171307.2, dated Sep. 25, 2020, 8 pp.

* cited by examiner

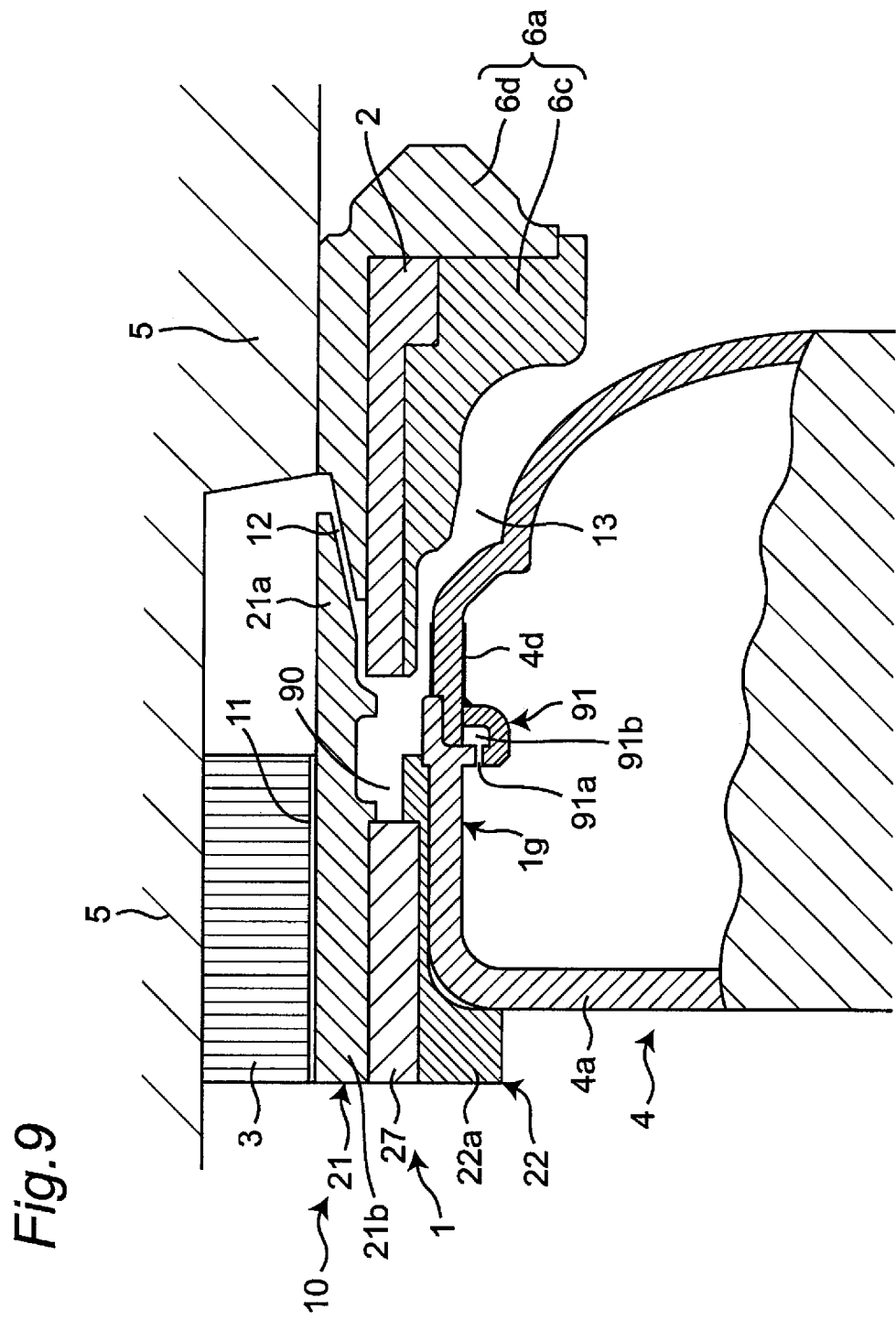

ROTATING ELECTRICAL MACHINE

CROSS-REFERENCE TO RELATED APPLICATION

This application claims the benefit of Japanese Patent Application No. 2018-087317, filed Apr. 27, 2018.

BACKGROUND OF THE INVENTION

Field of the Invention

The present invention relates to a rotating electrical machine of a brushless wound field type disposed on an outer circumference of a power transmitting apparatus.

Description of the Related Art

As a conventional technique disclosed in Patent Document 1, a rotating electrical machine shown in FIGS. 10A and 10B that supplies a magnetic flux from a field coil 102 that is stationary relative to a rotor 101 has been proposed. A stator 103 is disposed outside the rotor 101 in a radial direction. Such a structure makes it possible to eliminate the need for an electric power supply apparatus, the so-called slip ring using a brush conventionally required to magnetize the rotor 101. This is results in a rotating electrical machine 110 of a brushless wound field type.

The rotor 101 is composed of a first magnetic pole 137 and a second magnetic pole 138. The first magnetic pole 137 is a magnetic pole of a claw pole type facing the stator 103 with a first air gap 111 interposed therebetween. The second magnetic pole 138 is a magnetic pole of a claw pole type that faces the stator 103 with the first air gap 111 interposed therebetween and is located on the same circumference as the first magnetic pole 137 is located on. The first magnetic pole 137 and the second magnetic pole 138 are connected with each other by a coupling member 139 of a ring shape made of a non-magnetic material.

Note that the first air gap 111 is provided between the stator 103 and the rotor 101, and extends along an axial direction of a rotating axis 107. Further, a second air gap 112 is provided between a field coil core 106 of the field coil 102 and the first magnetic pole 137 of the rotor 101, and extends along the axial direction of the rotating axis 107. Further, another second air gap is provided between the field coil core 106 of the field coil 102 and the second magnetic pole 138 of the rotor 101, and extends along a direction orthogonal to the axial direction of the rotating axis 107.

Further, as disclosed in Patent Document 2, a structure in which a rotating electrical machine is disposed on an outer circumference of a power transmitting apparatus has been proposed. Such a structure makes it possible to start an engine by connecting the engine and the rotating electrical machine and to eliminate the need for a starter and an alternator required for a conventional automobile by causing the rotating electrical machine to function as a generator during traveling.

PRIOR ART DOCUMENT

Patent Documents

Patent Document 1: JP 3445492 B2
Patent Document 2: JP 2010-516558 T

SUMMARY OF THE INVENTION

When combining these two patent documents, that is, as shown in (b) of FIG. 8, attempting to arrange the rotating electrical machine 110 of a brushless wound field type on the outer circumference of the power transmitting apparatus 104, a combination of the structures disclosed in the two patent documents causes three members of the stator 103 fixed to a stationary case 105, the rotor 101, and the field coil 102 to be arranged in a narrow space on an inner circumferential side of the stationary case 105 and an outer circumferential side of the power transmitting apparatus 104 and on diameters that are coaxial with the rotating axis 107 but different from each other, which causes a problem that a severe restriction is imposed on a volume occupied by the rotating electrical machine 110, a degree of freedom in designing is limited, and the output performance of the rotating electrical machine 110 is limited.

Accordingly, an object of the present invention, having been conceived to solve the problem, is to provide a rotating electrical machine that allows an increase in degree of freedom in designing and an increase in output performance.

To achieve the object, the present invention is configured as described below.

According to an aspect of the present invention, there is provided a rotating electrical machine of a brushless wound field type disposed between a stationary case and a rotating member that rotates inside the stationary case, the rotating electrical machine comprising:

a stator held by the stationary case, the stator including an AC coil that generates a rotating magnetic field with an alternating current;

a field core held by the stationary case, the field core including a field coil that generates a magnetic flux with a direct current;

a rotor disposed on an outer circumferential surface of the rotating member and held rotatably relative to the stator and the field coil; and a rotor side core portion that is a part of the rotating member, wherein a first air gap is formed between the stator and the rotor, and is configured to allow a magnetic flux to flow between the stator and the rotor, a second air gap is formed between the field core and the rotor, and is configured to allow a magnetic flux to flow between the field core and the rotor, and a third air gap is formed between the field core and the rotor side core portion, and is configured to allow a magnetic flux to flow between the field core and the rotor side core portion.

According to the aspect of the present invention, in a narrow space on an inner circumferential side of the stationary case and an outer circumferential side of the rotating member, the rotor and the stator other than the field coil are arranged, which only requires the two members of the rotor and the stator to be arranged on diameters that are coaxial with a rotating axis but different from each other, and thus allows an increase in the degree of freedom in designing and an increase in the output performance of the rotating electrical machine. Further, since a part of the rotating member is made to function as the rotor side core portion, it is possible to reduce thicknesses, in the radial direction, of the members of the rotor forming the magnetic path, and, as a whole, reduce the size and weight while simplifying the structure.

BRIEF DESCRIPTION OF THE DRAWINGS

FIG. 9 is an enlarged cross-sectional view of a part of a rotating electrical machine according to a modification of the first embodiment, corresponding to the rotating electrical machine of FIG. 2A.

DETAILED DESCRIPTION OF THE INVENTION

Hereinafter, embodiments of the present invention will be described in detail with reference to the drawings.

First Embodiment

Figure 1:
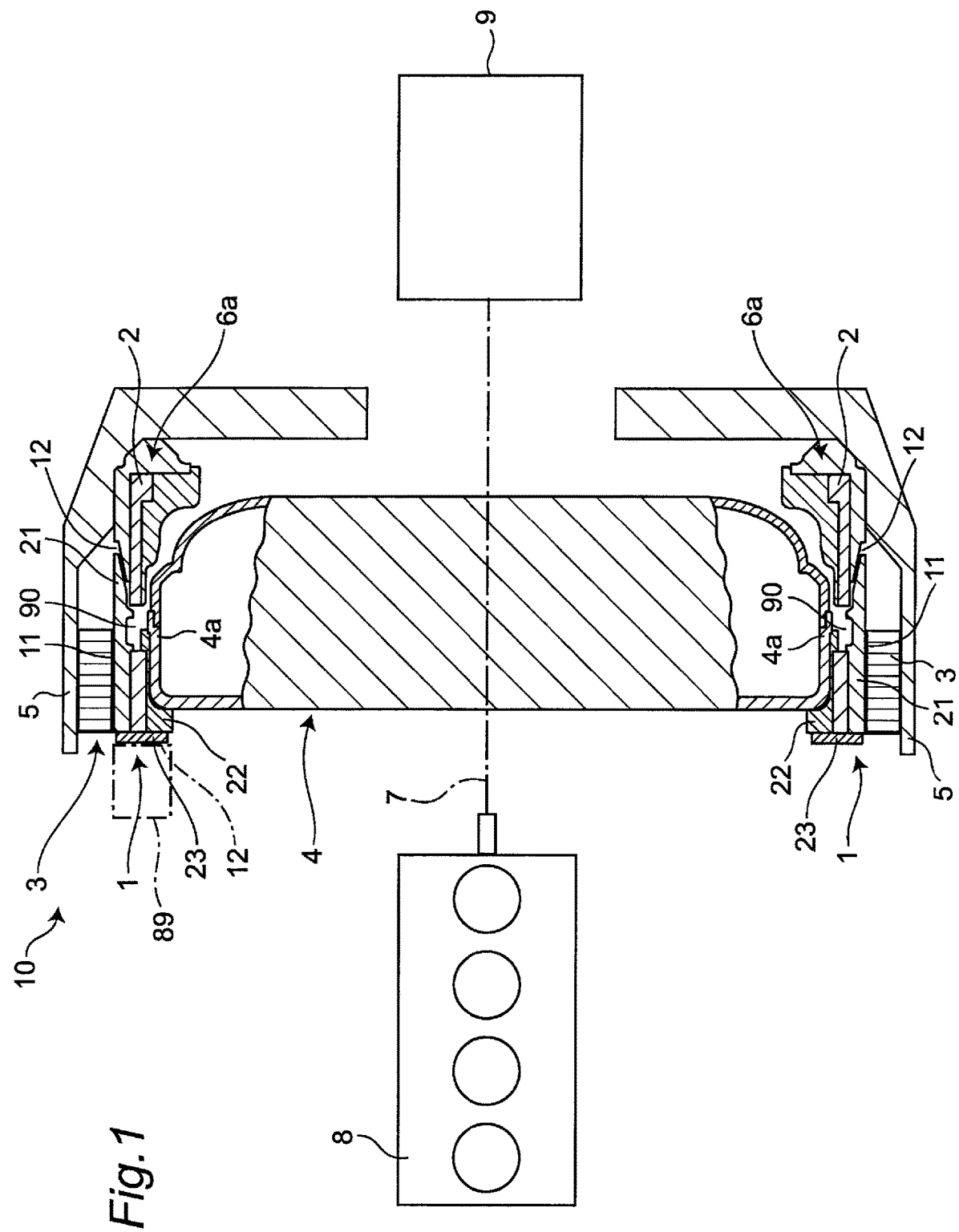
FIG. 1 is an explanatory diagram showing a cross-sectional view taken approximately along a direction orthogonal to a rotating axis of a rotating electrical machine according to a first embodiment of the present invention and an arrangement relation of the rotating electrical machine relative to an engine and a transmission.
Figure 2A:
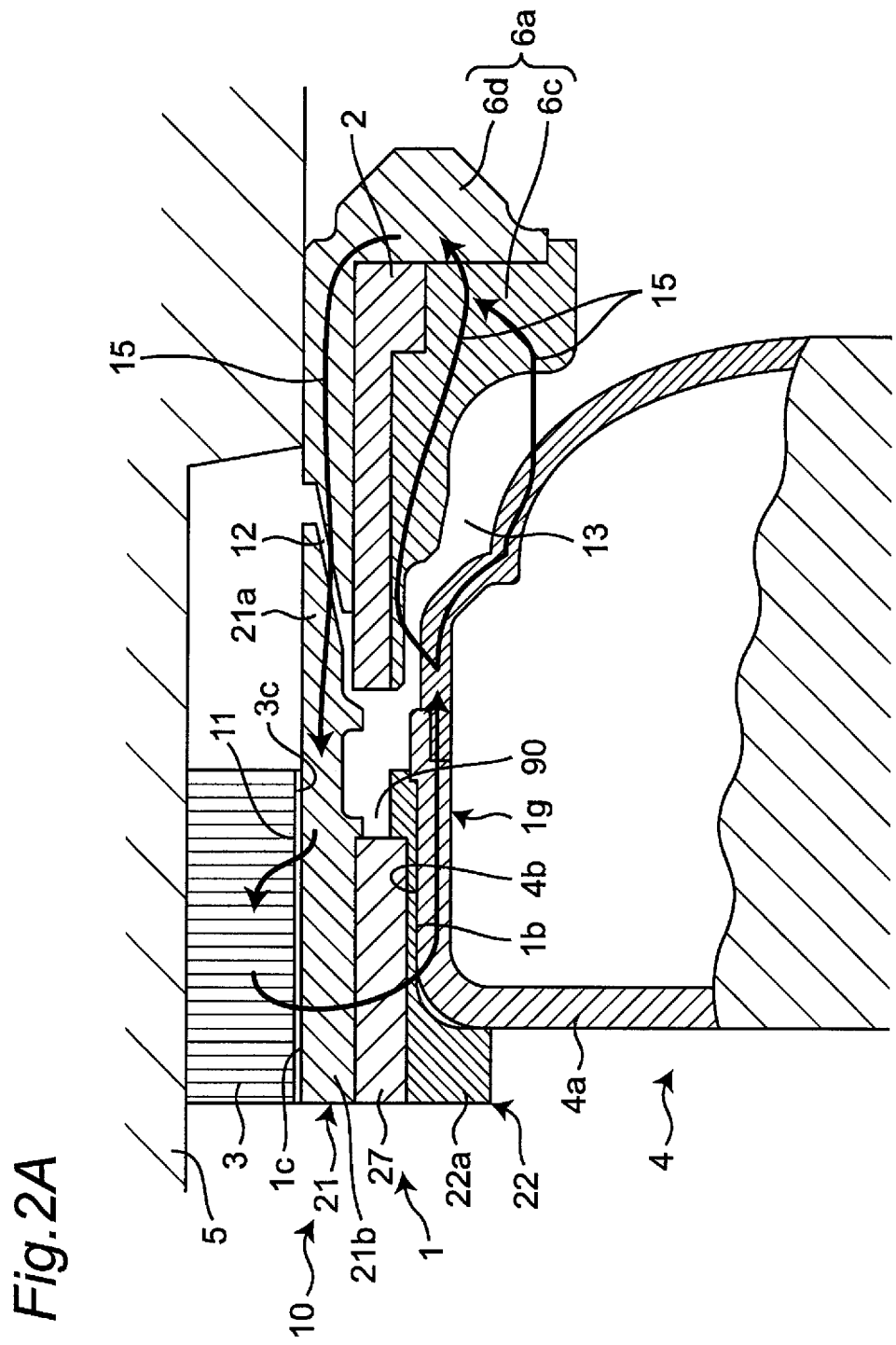
FIG. 2A is an enlarged cross-sectional view showing a part of the rotating electrical machine of FIG. 1.
Figure 2B:
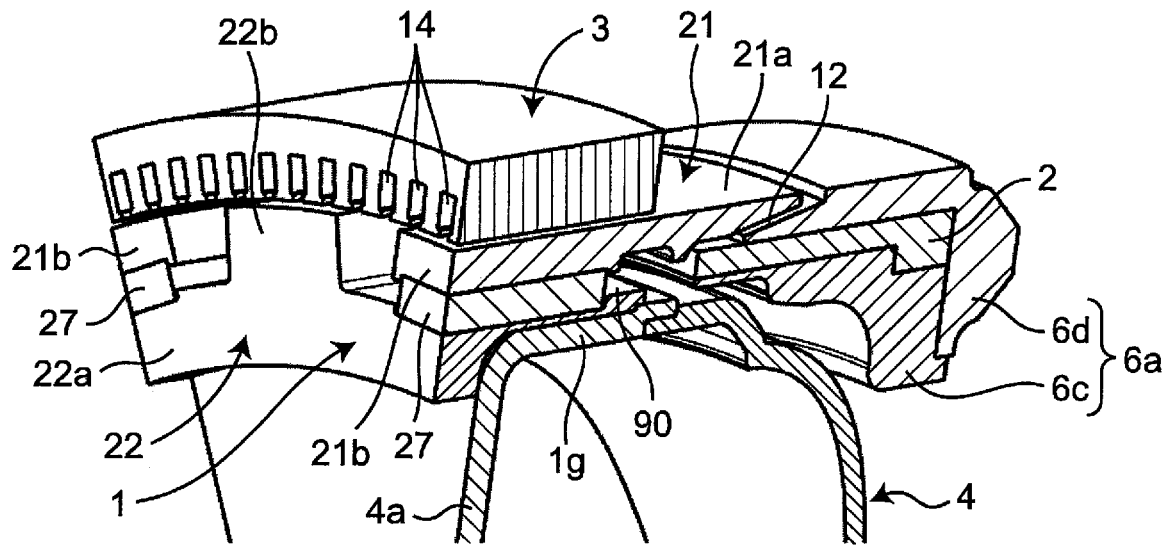
FIG. 2B is an enlarged perspective view of a part of the rotating electrical machine of FIG. 1.
Figure 2C:
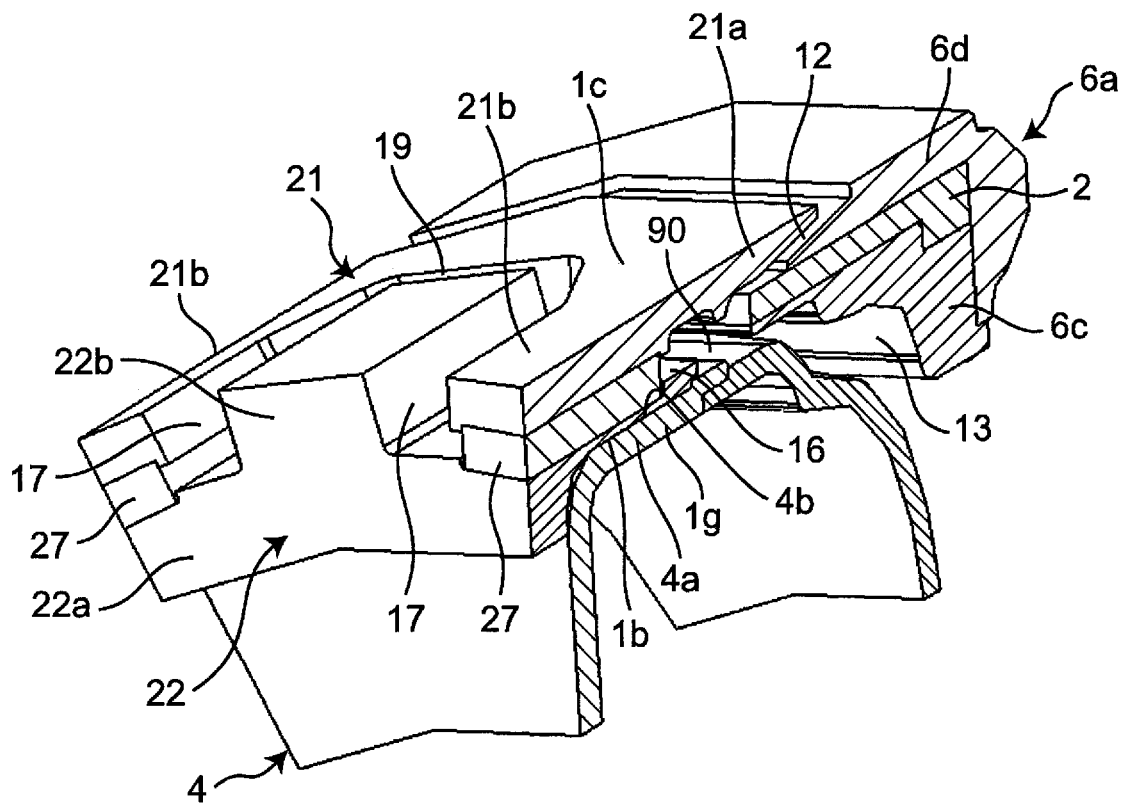
FIG. 2C is an enlarged perspective view of a part of the rotating electrical machine of FIG. 2B without a stator.
Figure 2D:
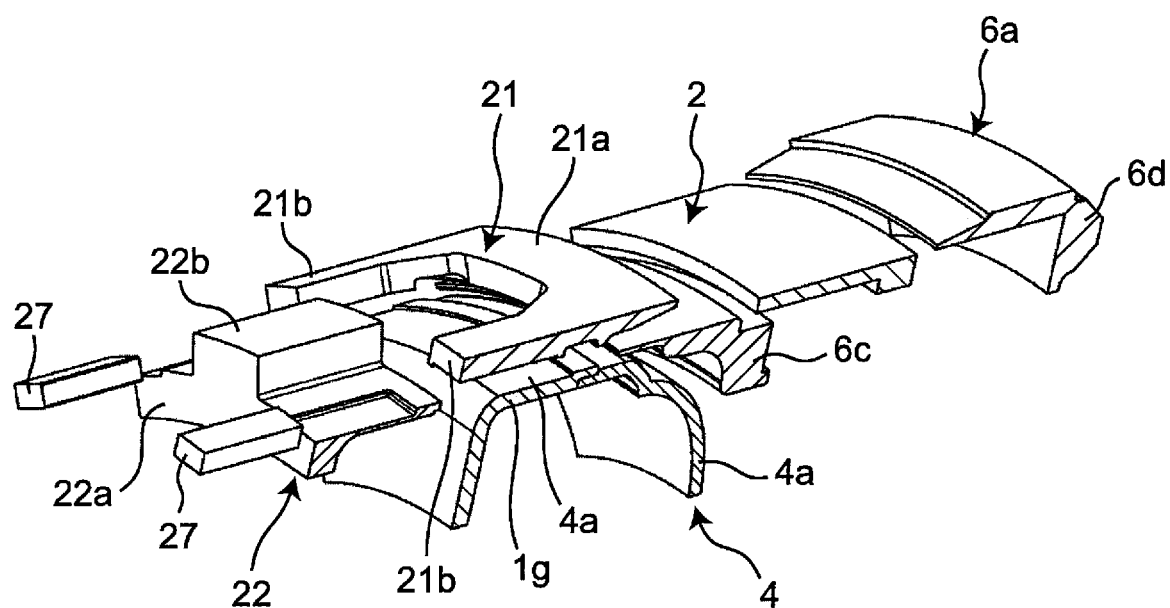
FIG. 2D is an enlarged exploded perspective view of a part of the rotating electrical machine of FIG. 1.
Figure 3:
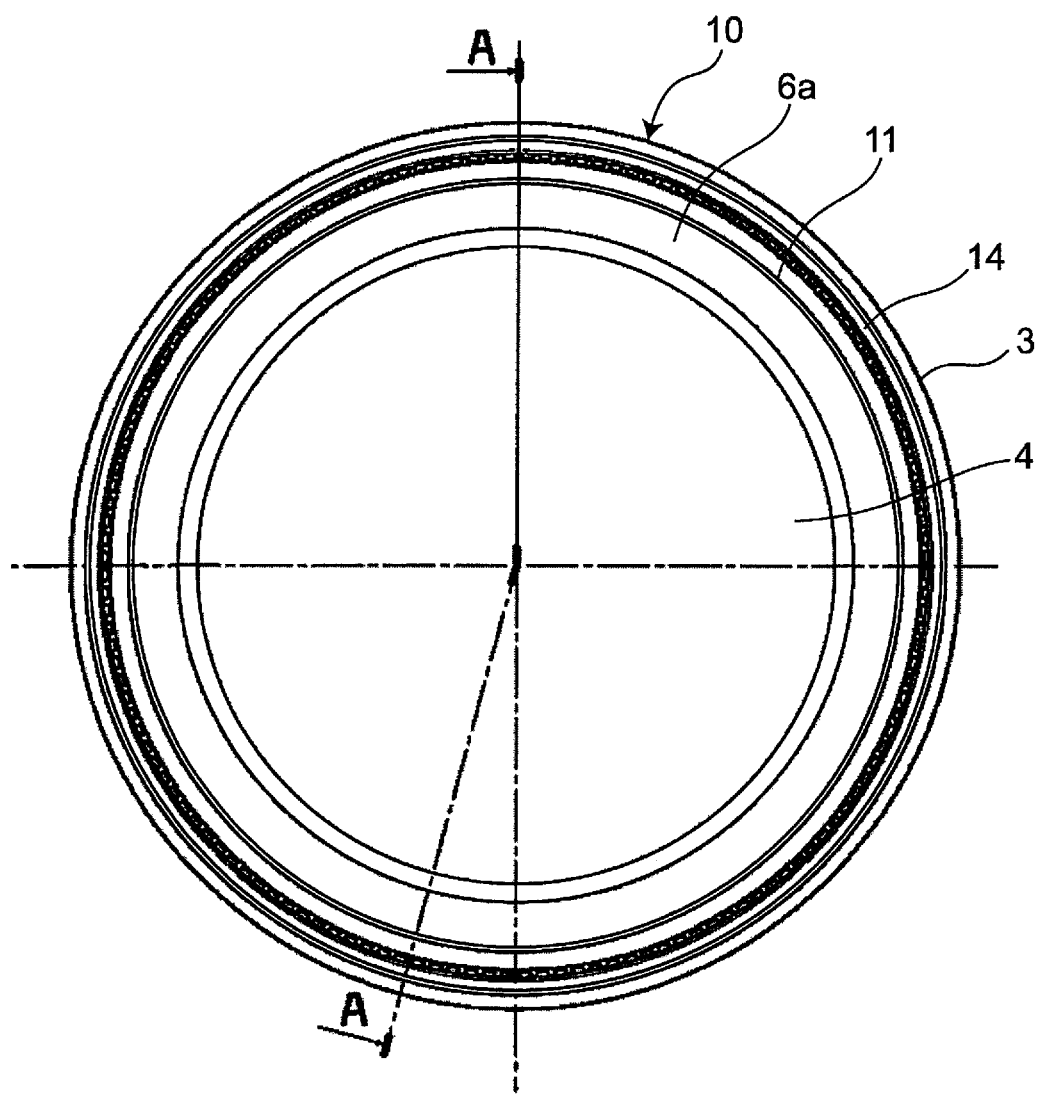
FIG. 3 is a front view of the rotating electrical machine according to the first embodiment, as viewed from the transmission side.
Figure 4:
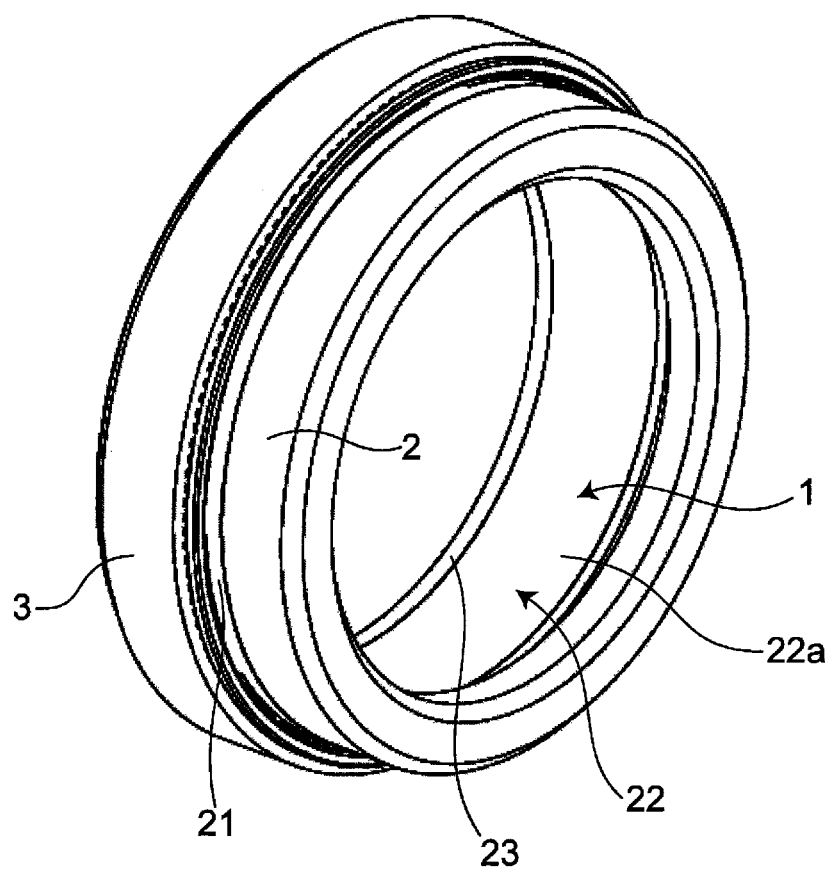
FIG. 4 is a perspective view of the rotating electrical machine according to the first embodiment.

As shown in FIGS. 1 to 2D, a rotating electrical machine according to a first embodiment of the present invention is a rotating electrical machine 10 of a brushless wound field type that is disposed between a stationary case 5 and a rotating member 4 that rotates inside the stationary case 5. The rotating electrical machine 10 includes at least a stator 3, a field coil 2, and a rotor 1.

The rotating electrical machine 10 is disposed, for example, between an engine 8 and a transmission 9 along a rotating axis 7. However, it is not limited to such a position. For example, the rotating electrical machine 10 may be disposed instead of an alternator, or may be disposed at any position such as a position between the transmission 9 and a wheel. In such a configuration, an example of the rotating member 4 is composed of a movable case such as an outer shell case 4a of a power transmitting apparatus 4.

Here, examples of the power transmitting apparatus 4 include a torque converter, a friction clutch, a flywheel, and the like.

The stator 3 is fixedly held by the stationary case 5 in a non-rotatable manner and is composed of a cylindrical member having a plurality of slots on which an AC coil 14 is wound. The stator 3 includes the AC coil 14 that generates a rotating magnetic field with an alternating current flowing through the AC coil 14.

The field coil 2 is disposed, for example, closer to the transmission than the stator 3 and the rotor 1 along the rotating axis 7, fixedly held by the stationary case 5 on a side adjacent to the transmission 9 of the stator 3, and generates a magnetic flux with a direct current.

A field core 6a includes the field coil 2. The field coil 2 has an L-shaped cross section.

The field core 6a is composed of an inner field core portion 6c and an outer field core portion 6d. In other words, in the field core 6a, the inner field core portion 6c is fixedly disposed on an inner side of the field coil 2, that is, on a side adjacent to the outer shell case 4a, and the outer field core portion 6d is fixedly disposed on an outer side of the field coil 2, that is, on a side adjacent to the stationary case 5. The inner field core portion 6c has an uneven shape curved along an outer shape of the outer shell case 4a, and, in an interval between the inner field core portion 6c and the outer shell case 4a, a plurality of narrow spaces are formed, which allows a magnetic path extending through a third air gap 13 to be formed as described later.

Note that the field coil 2 may be disposed closer to the engine than the stator 3 and the rotor 1 along the rotating axis 7, that is, on a side adjacent to the engine of the stator 3 via a second air gap 12 (to be described later) rather than on a side adjacent to the transmission 9 of the stator 3 (see a region 89 enclosed by a long dashed short dashed line in FIG. 1).

An inner circumferential surface 1b of the rotor 1 is disposed in contact with an outer circumferential surface 4b of the outer shell case 4a that is an outer circumference of the power transmitting apparatus 4, and an outer circumferential surface 1c of the rotor 1 faces an inner circumferential surface 3c of the stator 3 with a first air gap 11 interposed therebetween. A part of the outer shell case 4a adjacent to the inner circumferential surface 1b of the rotor 1 functions as a rotor side core portion 1g that is a part of the magnetic path as described later.

Further, an end surface adjacent to the transmission of the rotor 1 faces an end surface adjacent to the engine of the field coil 2. As a result, the rotor 1 is held integrally with the outer shell case 4a and is rotatable about the rotating axis 7 relative to the stator 3 and the field coil 2.

The first air gap 11 is formed between the stator 3 and the rotor 1 and allows a magnetic flux to flow between the stator 3 and the rotor 1. The first air gap 11 is an interval extending along an axial direction of the rotating axis 7 between the inner circumferential surface 3c of the stator 3 and the outer circumferential surface 1c of the rotor 1.

The second air gap 12 is formed between the field core 6a and the rotor 1 and allows a magnetic flux to flow between the field coil 2 and the rotor 1. The second air gap 12 is an interval that is formed, between the field core 6a and the rotor 1, extending along an inclining surface on an end adjacent to the transmission of the rotor 1 and an inclining surface on an end adjacent to the engine of the field core 6a in the axial direction of the rotating axis 7. The second air gap 12 inclines relative to the axial direction of the rotating axis 7 and is directed outward in a radial direction while extending from the engine side to the transmission side along a direction of a center axis X1.

Further, the third air gap 13 is formed between the field core 6a and the outer shell case 4a and allows a magnetic flux to flow between the field coil 2 and the outer shell case 4a. The third air gap 13 has an uneven shape curved along the shape of the outer shell case 4a. Specifically, the third air gap 13 has a width of at least 1 to 2 mm. This is because at least 1 to 2 mm needs to be secured in order to prevent the outer shell case 4a from coming into contact with the field core 6a that is stationary when the outer shell case 4a during rotation expands or swings outward in the radial direction and the axial direction.

Accordingly, the field coil 2 is shifted in the axial direction of the rotating axis 7 to be parallel to the rotor 1 with the second air gap 12 interposed between the field coil 2 and the rotor 1, and to the outer shell case 4a with the third air gap 13 interposed between the field coil 2 and the outer shell case 4a.

On the other hand, as shown in FIGS. 3 to 6, the rotor 1 is composed of a combination of a first magnetic pole 21, a second magnetic pole 22, and a magnetic pole holding member 23. Note that a longitudinal cross-sectional view taken along line A-A of FIG. 3 corresponds to a cross-sectional view of the rotating electrical machine 10, the power transmitting apparatus 4, and the like shown in the center of FIG. 1.

The first magnetic pole 21 is composed of a soft magnetic material such as iron and has a plurality of pawl portions 21b that have, for example, a rectangular thin plate shape and protrude from a first annular portion 21a in the axial direction of the rotating axis 7. The pawl portions 21b are arranged at regular intervals, for example, equal intervals, in a circumferential direction and all have the same length in the axial direction of the rotating axis 7. An outer circumferential surface of each of the pawl portions 21b is flush with an outer circumferential surface of the first annular portion 21a. When the first magnetic pole 21 and the second magnetic pole 22 are combined, the pawl portions 21b are kept from contact with the second magnetic pole 22, and a radial interval 16 is formed extending in the radial direction.

Figure 5:
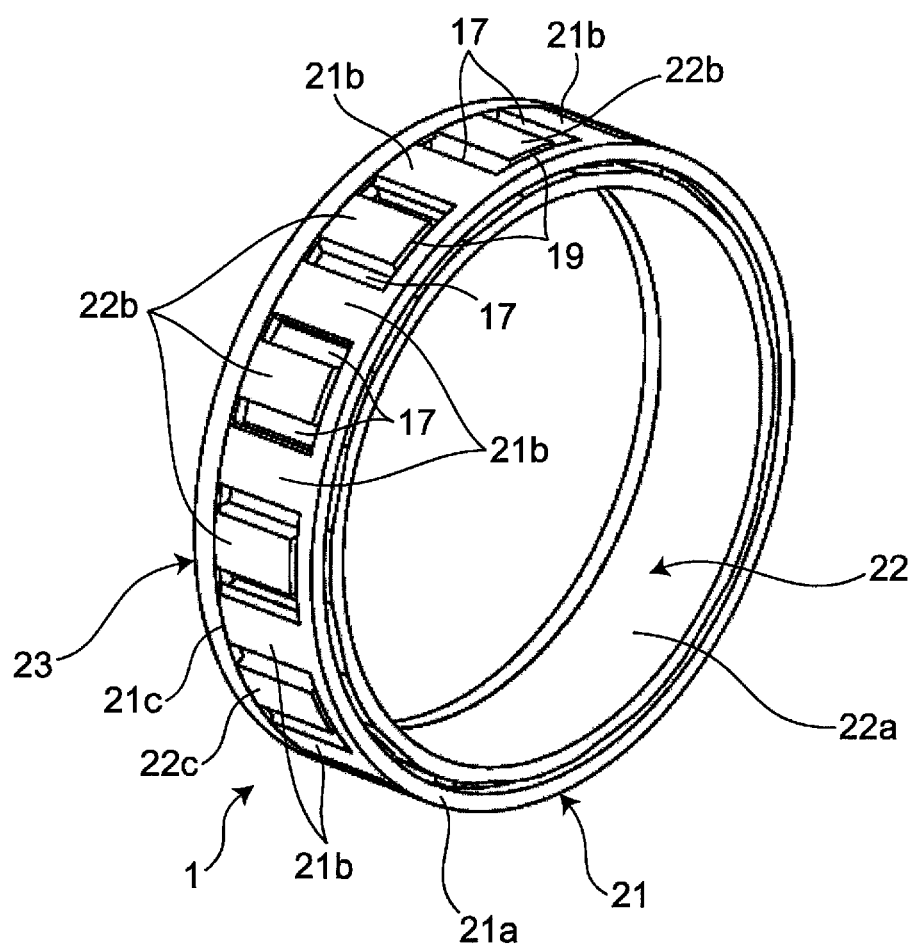
FIG. 5 is a perspective view of a rotor of the rotating electrical machine according to the first embodiment.
Figure 6:
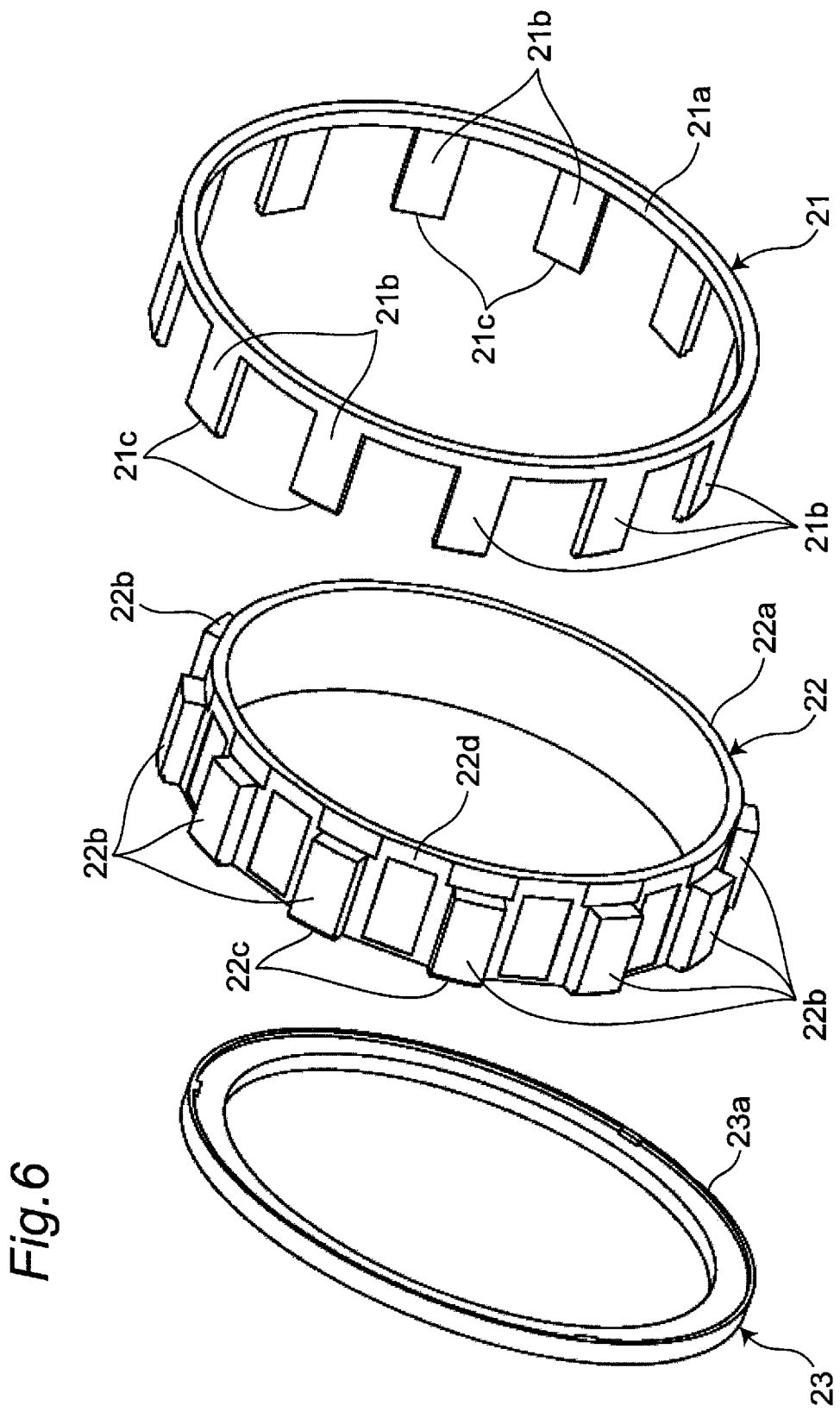
FIG. 6 is an exploded perspective view of the rotor of the rotating electrical machine according to the first embodiment.

The second magnetic pole 22 is composed of a soft magnetic material such as iron and is disposed inside the first annular portion 21a with the radial interval 16 interposed therebetween. The second magnetic pole 22 has a plurality of protrusions 22b that has, for example, a rectangular plate shape, protrude in the radial direction, and are arranged on an outer circumferential surface of a second annular portion 22a at circumferential intervals 17 in the circumferential direction, the second annular portion 22a being disposed partially overlapping the first annular portion 21a. The protrusions 22b are also arranged at regular intervals, for example, equal intervals, in the circumferential direction and all have the same height in the radial direction. The protrusions 22b all have the same length in the axial direction of the rotating axis 7 and are shorter in length than the pawl portions 21b. An outer circumferential surface of each of the protrusions 22b is disposed on a circle coaxial with a rotation axis of the rotor 1. Each of the protrusions 22b extends to an edge adjacent to the engine of the second annular portion 22a to form a second leading end engaging portion 22c while extending toward but terminating short of an edge adjacent to the transmission of the second annular portion 22a to form an inserting portion 22d having a narrow annular shape without the protrusion 22b. The first magnetic pole 21 is moved in the axial direction relative to the second magnetic pole 22 to insert each of the pawl portions 21b of the first magnetic pole 21 into an intermediate portion of the circumferential interval 17 between the protrusions 22b adjacent to each other, thereby combining the first magnetic pole 21 and the second magnetic pole 22 with the pawl portions 21b and the protrusions 22b alternately arranged in the circumferential direction. The first annular portion 21a of the first magnetic pole 21 is configured to be disposed above the inserting portion 22d with the radial interval 16 interposed therebetween. As shown in FIG. 5, with the first magnetic pole 21 and the second magnetic pole 22 combined with each other, between each of the pawl portions 21b and the second magnetic pole 22, the axial interval 19 between each of the protrusions 22b and the first annular portion 21a, the circumferential interval 17 in the circumferential direction, and the radial interval 16 in the radial direction are present. Accordingly, the first magnetic pole 21 and the second magnetic pole 22 are kept from contact with each other. In order to fix the first magnetic pole 21 and the second magnetic pole 22 to each other in this state, the magnetic pole holding member 23 is further provided.

Further, a permanent magnet 27 is disposed inside the rotor 1.

Figure 7:
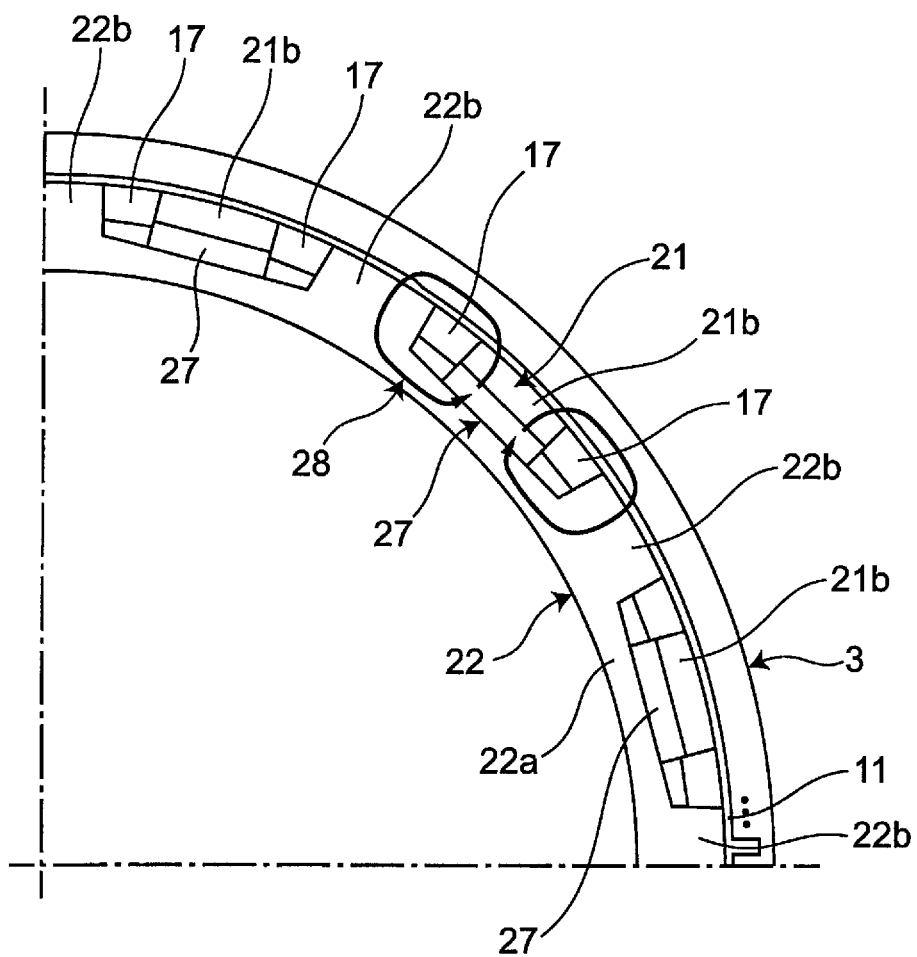
FIG. 7 is a partial front view of a rotating electrical machine according to a second embodiment.

More specifically, the permanent magnet 27 having, for example, a rectangular plate shape is provided at the same circumferential position as each of the pawl portions 21b of the first magnetic pole 21 is disposed, on an inner diameter side of each of the pawl portions 21b of the first magnetic pole 21 and on an outer diameter side of the second annular portion 22a of the second magnetic pole 22, and is sandwiched between an inner circumferential surface of each of the pawl portions 21b and the outer circumferential surface of the second annular portion 22a. This arrangement causes, as shown in FIG. 7, a magnet magnetic flux 28 of the permanent magnet 27 to be formed between each of the pawl portions 21b of the first magnetic pole 21 and a corresponding one of the protrusions 22b of the second magnetic pole 22.

The permanent magnet 27 is a magnet primarily made of neodymium or a magnet primarily made of ferrite. Specifically, as the permanent magnet 27, various kinds of permanent magnets such as a SmCo magnet, an AlNiCo magnet, a neodymium bonded magnet, and the like can be used. The permanent magnet 27 is disposed covering entirely or partially an inner surface of each of the pawl portions 21b.

Such a configuration makes it possible to increase output performance by using the magnet magnetic flux 28 of the permanent magnet 27 in addition to a magnetic flux generated in the rotor 1 by the field coil 2. Further, holding the permanent magnet 27 with the pawl portions 21b makes it possible to increase strength of the permanent magnet 27 against a centrifugal force, which can prevent the permanent magnet 27 from being deformed due to the centrifugal force and thus increase centrifugal strength during high speed rotation.

The magnetic pole holding member 23 is composed of a nonmagnetic material such as aluminum or austenitic stainless steel and is an annular member. The magnetic pole holding member 23 has a fitting portion 23a, for example, on an outer diameter side. To the fitting portion 23a, a first leading end engaging portion 21c of each of the pawl portions 21b of the first magnetic pole 21 and the second leading end engaging portion 22c of each of the protrusions 22b of the second magnetic pole 22 are fixedly fitted. The first leading end engaging portion 21c and the second leading end engaging portion 22c are fitted to the fitting portion 23a and fixed by bolting, shrink fitting, brazing, or the like, so that the first magnetic pole 21 and the second magnetic pole 22 are fixedly held by the magnetic pole holding member 23 with the first magnetic pole 21 and the second magnetic pole 22 kept from contact with each other.

As a specific example, the first leading end engaging portion 21c of each of the pawl portions 21b of the first magnetic pole 21 and the second leading end engaging portion 22c of each of the protrusions 22b of the second magnetic pole 22 are each formed in a step portion, and the step portion is fitted to an engaging recess of the fitting portion 23a and fixedly held in the radial direction. The second leading end engaging portion 22c is disposed at a leading end of each of the protrusions 22b as an example, but may be disposed at a leading end of the second annular portion 22a. When the magnetic flux is made to flow from the field coil 2 to magnetize the first magnetic pole 21 and the second magnetic pole 22, this configuration achieves efficient magnetization by causing the magnetic pole holding member 23 that is nonmagnetic to prevent a magnetic short, and allows the first magnetic pole 21 and the second magnetic pole 22 to be mechanically held by the magnetic pole holding member 23. Further, the configuration in which the first leading end engaging portion 21c of each of the pawl portions 21b of the first magnetic pole 21 is fixedly fitted to and held by the fitting portion 23a of the magnetic pole holding member 23 suppresses outward deformation of the pawl portions 21b due to a rotational centrifugal force, and thus makes it possible to increase rotational strength.

In the rotating electrical machine 10 configured as described above, when the field coil 2 is energized, a field coil magnetic flux 15 is generated.

The field coil magnetic flux 15 acts through the following magnetic path. That is, first, the field coil magnetic flux 15 passes from the outer field core portion 6d of the field core 6a through the second air gap 12, the first magnetic pole 21 of the rotor 1, the first air gap 11, the stator 3, the first air gap 11, the permanent magnet 27 of the rotor 1, and the second magnetic pole 22 of the rotor 1, and enters the rotor side core portion 1g that is the outer shell case 4a of the power transmitting apparatus 4. Thereafter, the field coil magnetic flux 15 returns from the rotor side core portion 1g through the third air gap 13 to the inner field core portion 6c of the field core 6a, thereby forming the magnetic path. In the third air gap 13, the magnetic path is formed at a plurality of locations where a distance between the rotor side core portion 1g and the inner field core portion 6c is small.

At this time, for example, when a direct current is made to flow through the field coil 2, the field coil magnetic flux 15 is excited, thereby magnetizing the first magnetic pole 21 and the second magnetic pole 22 to N pole and S pole, respectively.

Note that, when the arrangement direction of the magnets 21, 22 is reversed, that is, the first magnetic pole 21 becomes the S pole and the second magnetic pole 22 becomes the N pole, both the energizing direction of the field coil 2 and a flow direction through the magnetic path are also reversed.

Note that, in the magnetic path, in order to prevent the field coil magnetic flux 15 from flowing from the permanent magnet 27 or the first magnetic pole 21 directly to the inner field core portion 6c without entering the rotor side core portion 1g that is the outer shell case 4a, a gap 90 wider than the first to third air gaps 11, 12, 13 is formed between an end adjacent to the transmission of the permanent magnet 27 and the first magnetic pole 21 and an end adjacent to the engine of the inner field core portion 6c. Since the first magnetic pole 21 and the rotor side core portion 1g that is the outer shell case 4a are in contact with each other, the magnetic flux easily permeates, thereby easily forming the magnetic path from the first magnetic pole 21 to the rotor side core portion 1g that is the outer shell case 4a. Magnetic reluctance of the magnetic path needs to be smaller than magnetic reluctance of any gap between magnetic pole members. A difference between each of the first to third air gaps 11, 12, 13 and the gap 90 varies depending on the air gaps other than the gap 90, a distance between two surfaces, an amount of a magnetic flux to be made flow, or the like; thus, it is preferable that the gap 90 be twice or more as wide as the first to third air gaps 11, 12, 13.

A description will be given of a configuration where such a rotating electrical machine 10 serves as a starter to perform a start function. In accordance with a command to start the engine 8, an inverter (not shown) is driven to cause a three-phase alternating current to flow through the stator 3 to magnetize the stator 3 and to cause a current to flow through the field coil 2. Causing the current to flow through the field coil 2 excites the first magnetic pole 21 and the second magnetic pole 22 of the rotor 1. As a result, the rotor 1 starts to rotate relative to the stator 3, and an electromotive force having an induced voltage is generated in the stator 3.

Thereafter, the induced voltage increases in proportion to a rotation speed of the rotor 1, and when the rotation speed reaches an initial explosion rotation speed lower than an idling speed corresponding to idling of the engine 8 and thus, the start of the engine 8 is completed, the rotating electrical machine 10 automatically shifts to a power generation mode, that is, a mode where the rotating electrical machine 10 serves as a dynamo to perform a power generation function, so as to hold a predetermined induced voltage (required voltage).

In the power generation mode, when the field coil 2 remains excited, an excitation current is adjusted to make the induced voltage constant at a predetermined induced voltage. The excitation current is adjusted so that a magnetizing force of the rotor decreases as the rotation speed increases to make the induced voltage constant.

Further, when the field coil 2 is not excited, an advance angle of the three-phase alternating current is adjusted by the inverter to make the induced voltage constant at the predetermined induced voltage. Furthermore, the two methods may be combined for the adjustment.

Such control causes, when the rotor 1 rotates, the rotating electrical machine 10 to function as a dynamo.

As a result, connecting the engine 8 and the rotating electrical machine 10 allows the engine to start and allows the rotating electrical machine 10 to function as a generator (dynamo) during traveling. That is, controlling the rotating electrical machine 10 with the field coil 2 and the inverter allows the rotating electrical machine 10 to function as a starter or a generator (dynamo).

According to the first embodiment, in a narrow space on the inner circumferential side of the stationary case 5 and the outer circumferential side of the outer shell case 4a of the power transmitting apparatus 4 such as a torque converter, the rotor 1 and the stator 3 other than the field coil 2 are arranged, which only requires the two members of the rotor 1 and the stator 3 to be arranged on diameters that are coaxial with the rotating axis 7 but different from each other, and thus allows an increase in the degree of freedom in designing and an increase in the output performance of the rotating electrical machine 10.

Further, according to the first embodiment, since the outer shell case 4a of the power transmitting apparatus 4 such as a torque converter is made to function as the rotor side core portion 1g, it is possible to reduce thicknesses, in the radial direction, of the members such as the first magnetic pole 21 and the second magnetic pole 22 of the rotor 1 forming the magnetic path, and, as a whole, reduce the size and weight while simplifying the structure. As a specific example, the diameter of the rotor 1 can be reduced by about the radial thickness of the outer shell case 4*a*. For example, when the radial thickness of the outer shell case 4*a* is about 4 to 5 mm, the diameter of the rotor 1 can be reduced by about 8 to 10 mm.

Further, according to the first embodiment, in the rotating electrical machine 10 of a brushless wound field type disposed on the outer circumference of the automobile power transmitting apparatus 4, the second air gap 12 between the field coil 2 and the rotor 1 is formed inclining relative to the rotating axis 7. Specifically, a structure is employed in which the first magnetic pole 21 of the rotor 1 is an annular member having a large number of the pawl portions 21*b*, the second magnetic pole 22 is an annular member having a large number of the protrusions 22*b*, and the first and second magnetic poles 21, 22 are alternately arranged in the circumferential direction and held by the magnetic pole holding member 23 made of a nonmagnetic material. Such a configuration can exhibit the following effects.

Figure 8:
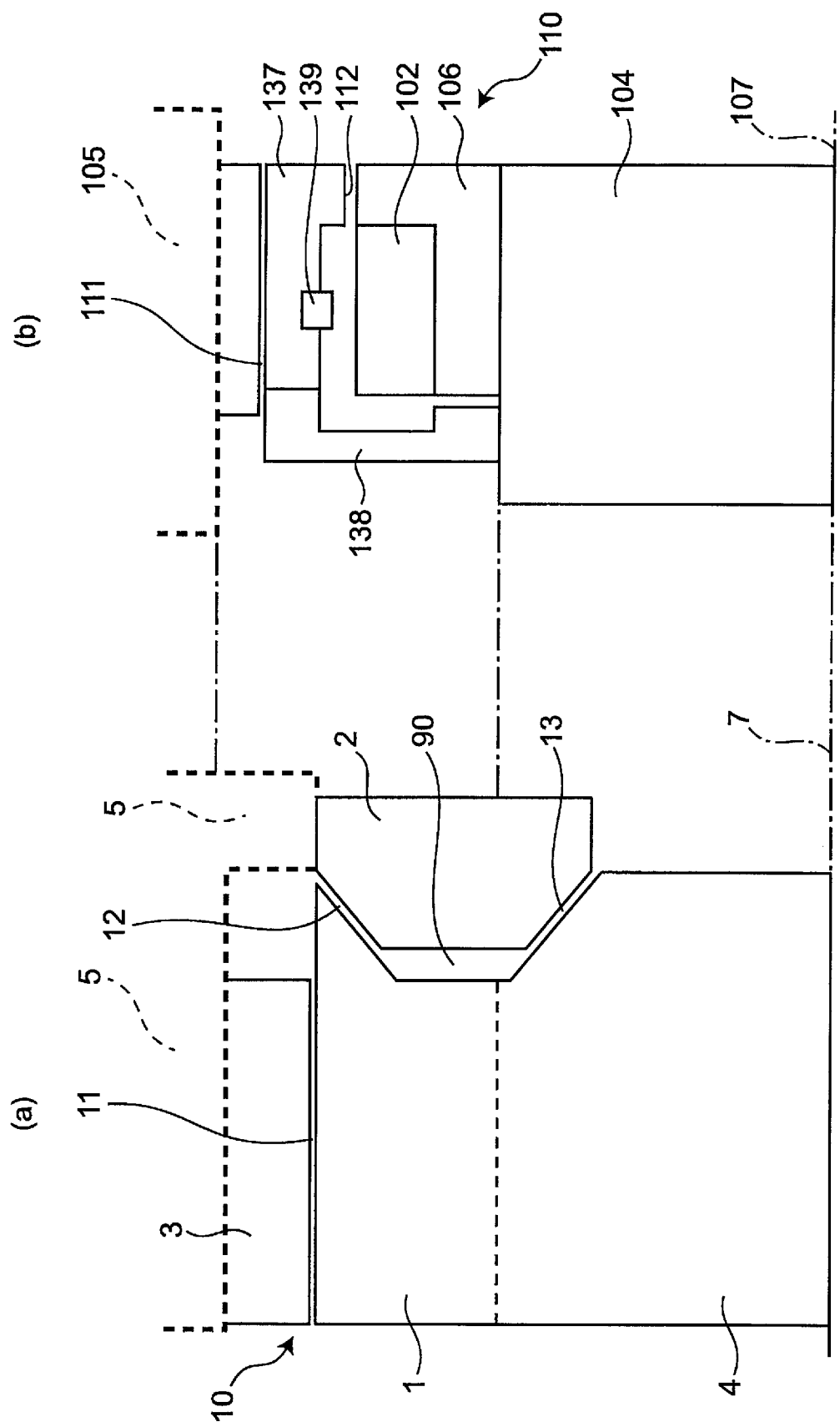
FIG. 8 is an explanatory diagram showing a relation between a configuration of the first embodiment and a configuration of a combination example of conventional documents.
Figure 10A:
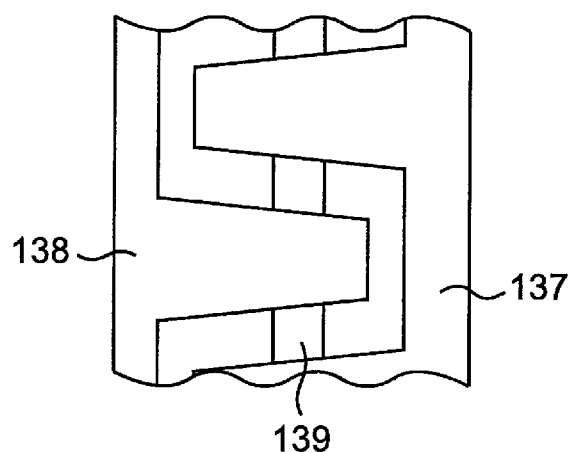
FIG. 10A is a plan view of a conventional rotating electrical machine showing a schematic configuration of the conventional rotating electrical machine.
Figure 10B:
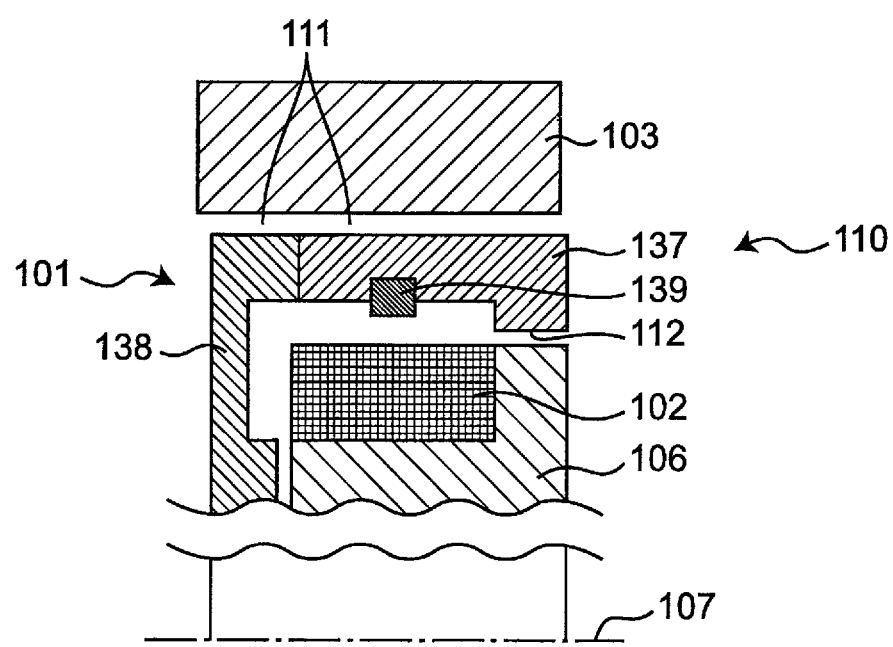
FIG. 10B is a longitudinal cross-sectional view of the conventional rotating electrical machine of FIG. 10A showing the schematic configuration of the conventional rotating electrical machine.

First, as shown in (b) of FIG. 8 as a combination example of conventional Patent Documents 1 and 2 that is a comparative example to the first embodiment, the rotating electrical machine 110 is disposed outside the power transmitting apparatus 104 in the radial direction, and three members of the stator 103, the rotor 101, and the field coil 102 are arranged in a space between the stationary case 105 and the power transmitting apparatus 104 in that order from the outside to the inside in the radial direction. In this case, the more the number of turns of the field coil 102 to increase the magnetic flux of the field coil 102, the more the thickness in the radial direction, which makes it unable to put the three members into the space and accordingly fails to increase the magnetic flux.

On the other hand, in the first embodiment, as shown in (a) of FIG. 8, a configuration is employed in which the field coil 2 is shifted in the axial direction of the rotating axis 7 to be parallel to the stator 3 and the rotor 1. This configuration cause only the two members of the stator 3 and the rotor 1 to be present outside the power transmitting apparatus 4 in the radial direction, which eliminates the need for a space for disposing the field coil 2 outside the power transmitting apparatus 4 in the radial direction. Accordingly, it is possible to reduce the radial dimension of the outside of the power transmitting apparatus 4 by at least the space for disposing the field coil 2, or increase the thickness of the stator 3 or the rotor 1 by the space for disposing the field coil 2, for example, for effective use of the space for disposing the field coil 2. Further, since the field coil 2 is disposed at a position shifted in the axial direction relative to the stator 3 and the rotor 1, it is possible to increase the thickness of the field coil 2 in the radial direction to increase the magnetic flux of the field coil 2 without considering the space for the stator 3 and the rotor 1. This makes it possible to increase the degree of freedom in designing.

Further, as shown in (b) of FIG. 8, when the stator 103, the rotor 101, and the field coil 102 are arranged in that order from the outside to the inside in the radial direction, it is required that a dimension of an interval between the rotor 101 and the field coil 102 be designed in consideration of the change in thickness caused by expansion due to the centrifugal force applied to the rotor 101 and be generally designed larger than a required dimension.

On the other hand, as shown in (a) of FIG. 8, the field coil 2 is shifted relative to the stator 3 and the rotor 1 in the axial direction to form an interval radially extending between the field coil 2 and the rotor 1 as the second air gap 12, which eliminates the need to take into consideration the change in thickness caused by expansion due to the centrifugal force applied to the rotor 1, and only requires adjustment of the interval dimension of the second air gap 12 along the axial direction. Therefore, the influence of the centrifugal force can be reduced.

Further, in the radial arrangement as shown in (b) of FIG. 8, concentricity (position adjustment of concentric position) between the rotor 101 that is a rotating side and the field coil 102 that is a stationary side is strictly adjusted; however, as shown in (a) of FIG. 8, when the field coil 2 is shifted in the axial direction, there is no need to adjust the concentricity between the rotor 1 that is the rotating side and the field coil 2 that is the stationary side as strict as the configuration in (b) of FIG. 8.

Further, in the configuration in (a) of FIG. 8, allowing the field coil 2 to be disposed in either a space adjacent to the engine or a space adjacent to the transmission of the rotor 1 in the axial direction makes it possible to use the space effectively.

Further, the rotor 1 of the rotating electrical machine 10 is connected to the power transmitting apparatus 4 that is a synchronous rotating member synchronously rotating with an output shaft (rotating axis) 7 of the engine 8, and the rotating electrical machine 10 is disposed so that the center axis of the output shaft of the engine 8 is aligned with a rotation axis of the rotor 1, which makes it possible to surely transmit a rotational driving force of the rotating electrical machine 10 to the engine 8 even in a cold state and surely start the engine 8 in the cold state.

Note that the present invention is not limited to the first embodiment and may be implemented in various other modes.

For example, as a modification shown in FIG. 9, in the first embodiment, when the outer shell case 4*a* of a torque converter, as an example of the power transmitting apparatus 4, functions as the rotor side core portion 1*g*, iron powder generated in the transmission accumulates, in the outer shell case 4*a*, on an inner circumference of the outer shell case 4*a* that functions as the rotor side core portion 1*g*, which may affect the function of the torque converter such as a lockup mechanism. To cope with such inconvenience, a configuration may be employed in which a pocket portion 91 is provided, at a position where the pocket portion 91 is kept from contact with the rotating member such as a turbine, extending in the circumferential direction on the inner circumferential surface 4*d* of the outer shell case 4*a* and recovers the iron powder. The pocket portion 91 functions as a metal powder recovering portion. The pocket portion 91 has an opening 91*a* on either of both ends in the axial direction and captures and recovers metal powder through the opening 91*a*. As an example, the pocket portion 91 has an inverted C shape in the longitudinal cross section in the radial direction, but may have any shape other than the C shape as long as the shape can capture iron powder.

The pocket portion 91 has the opening 91*a*, having an annular shape as viewed from the engine side, formed on a side adjacent to the engine, and a side adjacent to the transmission of the pocket portion 91 is closed. Conversely, the pocket portion 91 may have the opening 91*a*, having an annular shape as viewed from the transmission side, formed on the side adjacent to the transmission, and the side adjacent to the engine of the pocket portion 91 may be closed. A storage portion 91*b* that communicates with the opening 91*a* along the rotating axis, is larger than the opening 91a in size, both inward and outward in the radial direction, and has an annular shape as viewed from the engine side is formed. Even when iron powder accumulates on the inner circumferential surface 4d of the outer shell case 4a, such a pocket portion 91 can cause the iron powder to enter the storage portion 91b through the opening 91a due to the centrifugal force and a working force of oil to recover the irons powder.

Note that it is preferable that such a pocket portion 91 is disposed on the entire circumference, but it goes without saying that the pocket portion 91 may be disposed partially in the circumferential direction.

Further, instead of such a pocket portion 91, a permanent magnet may be disposed at a portion where iron powder accumulates to cause the iron powder to be held by a magnetic force.

Note that proper combination of embodiment(s) or modified example(s) arbitrary selected out of the above variety of embodiments or examples can exert the effects of the respective embodiments or examples. While combination of embodiments, combination of examples, or combination of an embodiment and an example is possible, combination of characteristics of different embodiments or examples is also possible.

The rotating electrical machine according to the aspect of the present invention allows an increase in the degree of freedom in designing and an increase in the output performance, and is suitable for a rotating electrical machine that is not only used in a vehicle, for example, a power transmitting apparatus including a rotating electrical machine that integrally has a power generating function of an alternator and an engine start function of a starter motor, but also widely and generally used in a power generating apparatus.

DESCRIPTION OF SYMBOLS 1 rotor
1b inner circumferential surface of rotor
1c outer circumferential surface of rotor
1g rotor side core portion
2 field coil
3 stator
3c inner circumferential surface of stator
4 power transmitting apparatus
4a outer shell case
4b outer circumferential surface of outer shell case
5 stationary case
6a field core
6c inner field core portion
6d outer field core portion
7 rotating axis
8 engine
9 transmission
10 rotating electrical machine of a brushless wound field type
11 first air gap
12 second air gap
13 third air gap
14 AC coil
15 field coil magnetic flux
16 radial interval
17 circumferential interval
19 axial interval
21 first magnetic pole
21a first annular portion
21b pawl portion
21c first leading end engaging portion
22 second magnetic pole
22a second annular portion
22b protrusion
22c second leading end engaging portion
22d inserting portion
23 magnetic pole holding member
23a fitting portion
27 permanent magnet
28 magnetic flux of permanent magnet
89 region where field coil is disposed on a side adjacent to engine of stator
90 gap
91 pocket portion

What is claimed is:

1. A rotating electrical machine of a brushless wound field type disposed between a stationary case and a rotating member that rotates inside the stationary case, the rotating electrical machine comprising:
   a stator held by the stationary case, the stator including an AC coil that generates a rotating magnetic field with an alternating current;
   a field core held by the stationary case, the field core including a field coil that generates a magnetic flux with a direct current;
   a rotor disposed such that an inner circumferential surface of the rotor directly contacts an outer circumferential surface of the rotating member to form a contact surface therebetween, the rotor held rotatably relative to the stator and the field coil; and
   a rotor side core portion including the outer circumferential surface of the rotating member, wherein
   a first air gap is formed between the stator and the rotor, and is configured to allow a magnetic flux to flow between the stator and the rotor,
   a second air gap is formed between the field core and the rotor, and is configured to allow a magnetic flux to flow between the field core and the rotor, and
   a third air gap is defined by the field core and the outer circumferential surface of the rotating member, and is configured to allow a magnetic flux to flow between the field core and the rotor side core portion, the third gap at least partly overlapping the contact surface between the inner circumferential surface of the rotor and the outer circumferential surface of the rotating member as viewed along an axial direction of a rotating axis.

2. The rotating electrical machine according to claim 1, wherein the magnetic flux of the field coil acts to form a magnetic path that extends from the field core through the second air gap, the rotor, the first air gap, the stator, the first air gap, the rotor, the rotor side core portion, and the third air gap, and returns to the field core.

3. The rotating electrical machine according to claim 2, wherein the rotating member is an outer shell case of a torque converter.

4. The rotating electrical machine according to claim 2, further comprising
   a metal powder recovering portion extending on an inner circumferential surface of the rotating member in a circumferential direction, the metal powder recovering portion being configured to recover metal powder accumulated on the inner circumferential surface of the rotating member.

5. The rotating electrical machine according to claim 2, wherein the rotating member is an outer shell case of a friction clutch.

6. The rotating electrical machine according to claim 2, wherein
the rotor includes
a first magnetic pole having a plurality of pawl portions protruding from a first annular portion in the axial direction of the rotating axis,
a second magnetic pole disposed on the outer circumferential surface of the rotating member, the second magnetic pole having a plurality of protrusions that protrude in a radial direction and are arranged on an outer circumferential surface of a second annular portion at circumferential intervals in a circumferential direction, the second annular portion being disposed inside the first magnetic pole and partially overlapping the first magnetic pole, and
a magnetic pole holding member with an annular shape having a fitting portion where the pawl portions of the first magnetic pole and the protrusions of the second magnetic pole are fixedly fitted to each other,
each of the pawl portions of the first magnetic pole is inserted into the interval between the protrusions of the second magnetic pole to alternately arrange the pawl portions of the first magnetic pole and the protrusions of the second magnetic pole in the circumferential direction, and
the first magnetic pole and the second magnetic pole are fixedly fitted to the magnetic pole holding member without coming into contact with each other.

7. The rotating electrical machine according to claim 6, wherein when the magnetic flux passes through the rotor from the stator toward the rotor side core portion, the magnetic flux passes from the first magnetic pole toward the second magnetic pole.

8. The rotating electrical machine according to claim 1, wherein the rotating member is an outer shell case of a torque converter.

9. The rotating electrical machine according to claim 8, further comprising
a metal powder recovering portion extending on an inner circumferential surface of the rotating member in a circumferential direction, the metal powder recovering portion being configured to recover metal powder accumulated on the inner circumferential surface of the rotating member.

10. The rotating electrical machine according to claim 8, wherein
the rotor includes
a first magnetic pole having a plurality of pawl portions protruding from a first annular portion in the axial direction of the rotating axis,
a second magnetic pole disposed on the outer circumferential surface of the rotating member, the second magnetic pole having a plurality of protrusions that protrude in a radial direction and are arranged on an outer circumferential surface of a second annular portion at circumferential intervals in a circumferential direction, the second annular portion being disposed inside the first magnetic pole and partially overlapping the first magnetic pole, and
a magnetic pole holding member with an annular shape having a fitting portion where the pawl portions of the first magnetic pole and the protrusions of the second magnetic pole are fixedly fitted to each other,
each of the pawl portions of the first magnetic pole is inserted into the interval between the protrusions of the second magnetic pole to alternately arrange the pawl portions of the first magnetic pole and the protrusions of the second magnetic pole in the circumferential direction, and
the first magnetic pole and the second magnetic pole are fixedly fitted to the magnetic pole holding member without coming into contact with each other.

11. The rotating electrical machine according to claim 1, further comprising
a metal powder recovering portion extending on an inner circumferential surface of the rotating member in a circumferential direction, the metal powder recovering portion being configured to recover metal powder accumulated on the inner circumferential surface of the rotating member.

12. The rotating electrical machine according to claim 11, wherein
the rotor includes
a first magnetic pole having a plurality of pawl portions protruding from a first annular portion in the axial direction of the rotating axis,
a second magnetic pole disposed on the outer circumferential surface of the rotating member, the second magnetic pole having a plurality of protrusions that protrude in a radial direction and are arranged on an outer circumferential surface of a second annular portion at circumferential intervals in a circumferential direction, the second annular portion being disposed inside the first magnetic pole and partially overlapping the first magnetic pole, and
a magnetic pole holding member with an annular shape having a fitting portion where the pawl portions of the first magnetic pole and the protrusions of the second magnetic pole are fixedly fitted to each other,
each of the pawl portions of the first magnetic pole is inserted into the interval between the protrusions of the second magnetic pole to alternately arrange the pawl portions of the first magnetic pole and the protrusions of the second magnetic pole in the circumferential direction, and
the first magnetic pole and the second magnetic pole are fixedly fitted to the magnetic pole holding member without coming into contact with each other.

13. The rotating electrical machine according to claim 1, wherein the rotating member is an outer shell case of a friction clutch.

14. The rotating electrical machine according to claim 13, wherein
the rotor includes
a first magnetic pole having a plurality of pawl portions protruding from a first annular portion in the axial direction of the rotating axis,
a second magnetic pole disposed on the outer circumferential surface of the rotating member, the second magnetic pole having a plurality of protrusions that protrude in a radial direction and are arranged on an outer circumferential surface of a second annular portion at circumferential intervals in a circumferential direction, the second annular portion being disposed inside the first magnetic pole and partially overlapping the first magnetic pole, and
a magnetic pole holding member with an annular shape having a fitting portion where the pawl portions of the first magnetic pole and the protrusions of the second magnetic pole are fixedly fitted to each other,
each of the pawl portions of the first magnetic pole is inserted into the interval between the protrusions of the second magnetic pole to alternately arrange the pawl portions of the first magnetic pole and the protrusions of the second magnetic pole in the circumferential direction, and the first magnetic pole and the second magnetic pole are fixedly fitted to the magnetic pole holding member without coming into contact with each other.

15. The rotating electrical machine according to claim 1, wherein the rotor includes a first magnetic pole having a plurality of pawl portions protruding from a first annular portion in the axial direction of the rotating axis, a second magnetic pole disposed on the outer circumferential surface of the rotating member, the second magnetic pole having a plurality of protrusions that protrude in a radial direction and are arranged on an outer circumferential surface of a second annular portion at circumferential intervals in a circumferential direction, the second annular portion being disposed inside the first magnetic pole and partially overlapping the first magnetic pole, and a magnetic pole holding member with an annular shape having a fitting portion where the pawl portions of the first magnetic pole and the protrusions of the second magnetic pole are fixedly fitted to each other, each of the pawl portions of the first magnetic pole is inserted into the interval between the protrusions of the second magnetic pole to alternately arrange the pawl portions of the first magnetic pole and the protrusions of the second magnetic pole in the circumferential direction, and the first magnetic pole and the second magnetic pole are fixedly fitted to the magnetic pole holding member without coming into contact with each other.

16. The rotating electrical machine according to claim 15, wherein when the magnetic flux passes through the rotor from the stator toward the rotor side core portion, the magnetic flux passes from the first magnetic pole toward the second magnetic pole.

* * * * *